(12) United States Patent
Weber et al.

(10) Patent No.: US 6,298,565 B1
(45) Date of Patent: Oct. 9, 2001

(54) STEERING ANGLE SENSOR WITH REVOLUTION COUNTER

(75) Inventors: Petra Weber, Bietigheim-Bissingen; Klaus Neckel, Vaihingen; Christian Hohler, Tamm; Harald Traub, Leingarten, all of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/101,910

(22) PCT Filed: Jan. 10, 1997

(86) PCT No.: PCT/EP37/00095

§ 371 Date: Mar. 1, 1999

§ 102(e) Date: Mar. 1, 1999

(87) PCT Pub. No.: WO97/26173

PCT Pub. Date: Jul. 24, 1997

(30) Foreign Application Priority Data

Jan. 20, 1996 (DE) ................................................ 196 01 965

(51) Int. Cl.[7] .................................................. G01B 7/30
(52) U.S. Cl. ............................................. 33/1 PT; 33/1 N
(58) Field of Search ..................................... 33/1 PT, 1 N, 33/534; 235/1 C, 448, 453, 103

(56) References Cited

U.S. PATENT DOCUMENTS

| | | | |
|---|---|---|---|
| 3,845,283 | * 10/1974 | Young | 235/1 C |
| 3,874,587 | * 4/1975 | McGann et al. | 235/103 |
| 4,244,515 | * 1/1981 | Kondo | 235/1 C |
| 4,362,927 | * 12/1982 | Herrmann et al. | 235/1 C |
| 4,626,682 | * 12/1986 | Hara et al. | 33/1 N |
| 4,789,342 | 12/1988 | Shitanoki . | |
| 4,910,392 | * 3/1990 | Bannister et al. | 235/1 C |
| 5,218,769 | * 6/1993 | Tranchon | 33/1 PT |
| 5,301,434 | * 4/1994 | Imaizumi | 33/1 PT |
| 5,473,237 | * 12/1995 | Steinech et al. | 318/605 |
| 5,646,523 | * 7/1997 | Kaiser et al. | 341/15 |
| 5,686,804 | * 11/1997 | Siraky | 318/640 |
| 5,930,905 | * 8/1999 | Zabler et al. | 33/1 PT |

FOREIGN PATENT DOCUMENTS

| | | |
|---|---|---|
| 4129232 | 3/1993 | (DE) . |
| 4137092 | 5/1993 | (DE) . |
| 4229610 | 6/1993 | (DE) . |
| 4409892 | 9/1995 | (DE) . |

OTHER PUBLICATIONS

Search Report of the German Patent Office for Application 196 01 965.6.

* cited by examiner

Primary Examiner—Diego Gutierrez
Assistant Examiner—Madeline Gonzalez
(74) Attorney, Agent, or Firm—Rader, Fishman & Grauer PLLC

(57) ABSTRACT

This invention relates to a steering angle sensor, particularly for yawing moment control in automotive vehicles. In order to determine the required steering angle of the steered wheels the angle of rotation of the steering wheel is measured. To this end, a code disk is used which enables the reading of the position of the angle of rotation of the disk. As the steering wheel can perform a plurality of revolutions in order to pivot the steered wheels the result readable at the code disk is ambiguous. This invention suggests a counter which records the revolutions of the code disk, starting from a zero position. Further advantageous developments involve the design of the gear mechanism and the evaluation of the signals of the counter.

10 Claims, 3 Drawing Sheets

STEERING ANGLE SENSOR WITH REVOLUTION COUNTER

BACKGROUND OF THE INVENTION

1. Field of Invention

This invention relates to angular sensors and more particularly relates to angular sensors used to detect steering wheel position, especially a steering angle sensor used for yaw angle control in an automotive vehicle.

2. Description of Related Art

In control systems for yaw angle control of an automobile, it is important that a value describing the angle position of the front wheels is in-put. However, for practical reasons it has become usual not to directly measure the steering angle of the wheels but rather the angle of rotation of the steering wheel which is closely associated with the angle position of the front wheels. To accomplish this, there are sensors which work with a so-called code disk operatively coupled with the steering wheel. Such a device has been described in the applicant's patent application 185 32 903.1. To effect a finer adjustment of the desired angle position of the wheels and to reduce the energy effort needed for steering, however, a transmission is inserted between the steering wheel and the vehicle wheels so that a plurality of revolutions of the steering wheel is necessary for adjusting the vehicle wheels by a larger angle.

Since the above-mentioned code disk is coupled with the steering wheel, it is possible to indicate the absolute angle position of the steering wheel, yet not how many revolutions of the steering wheel have already taken place, starting from a neutral position of the vehicle wheels.

One solution is to measure the difference in the speeds of rotation of the front wheels of a vehicle during driving. This allows for a rough determination of the angle position of the front wheels so that it is possible to determine the number of revolutions already performed by the steering wheel, starting from a normal position. In this manner, permanently adding the steering wheel revolutions in one direction or in the other direction, it is possible to follow the number of the momentarily available steering wheel revolutions and to thus provide corresponding information. This is, however, impossible for modern steering angle sensors with electric or electronic evaluation such as in the case of the above-described code disk since, during parking, the electric power of these vehicles is turned off while it must nevertheless be possible to pivot the wheels in the turned-off condition. When turning on the electric power again, in this case, the relevant value of revolution would actually differ from the value stored at the time when the electric power supply was turned off. Additionally, the determination of the number of revolutions becomes quite inaccurate during extremely slow speeds due to different speeds of rotation of the front wheels.

SUMMARY OF THE INVENTION

It is an object of this invention to provide, in such a steering angle sensor, the possibility of precisely stating the momentary number of revolutions of the steering wheel even when the steering wheel has been moved, with the supply voltage turned off, and thus a number of revolutions is relevant upon the start of the vehicle which differs from the value at the time of turning-off the supply voltage.

Thus, this invention utilizes an additional counter which provides information describing the actual number of revolutions of the steering wheel. It is possible to provide this information electronically since it will only be needed when the electric power supply of the vehicle is turned on because yaw angle determination is for the purpose of eliminating any danger of skidding. Mechanical coupling between the code disk and the counter ensures that the latter will preparatorily be adjusted to the correct value even if the electric power supply is turned off. Even when the supply voltage is turned off, the counter will follow the change of the steering angle of the wheels, yet will provide information only when the electric power supply has been turned on again.

While it is necessary to couple the code disk mechanically with the counter in order to realize this invention, a further object of this invention uses a gear reduction similar to that in a clockwork to ensure that the counter will index by one step to the next position in case of a full revolution of the code disk. However, it is also possible to use a step-by-step switch as mechanical gearing which will index by one step to the next position when the code disk has covered a full revolution. In such an arrangement, the code disk may move both a rotating and an axially displacing actuator.

When an electric signal is used as an output signal characteristic of the revolutions, the present invention may employ a rotary switch that emits electric signals, the rotary switch being driven by a mechanical gearing formed by a step-by-step switch.

Additionally, in order to electrically evaluate the momentarily available number of steering wheel revolutions with respect to the total momentarily available number of revolutions, a voltage is applied to one contact out of a sufficient plurality of contacts describing the maximum number of revolutions. A voltage applied to a certain contact will therefore render a unique value with regard to the momentarily available number of revolutions.

A design is disclosed wherein each number of steering wheel revolutions deviating from the zero position is assigned a contact of its own. By supplying electric power to a particular contact it is thus possible to provide electric information on the number of momentarily available revolutions of the steering wheel. The direction of rotation of the steering wheel determines whether to add the following numbers of revolutions to the computed value or whether to subtract it therefrom. If the steering wheel has performed three clockwise revolutions, starting from a zero position, revolution number 3 will have been reached. If, subsequently, a counterclockwise revolution is performed with the steering wheel, a revolution is subtracted, resulting in a setting of revolution number 2. The analogous procedure occurs with a counterclockwise revolution of the steering wheel, proceeding from the zero position.

A design of the rotary switch is disclosed wherein a voltage applied to the contact ring, designed as a slip ring, is applied to one of the circularly arranged contact pieces which rotates with the number of revolutions. Regarding the evaluation of the electric signals describing the number of revolutions it is also possible to connect each contact piece with another resistor and to connect these resistors parallel to each other. If the internal resistance of the current source is big enough or if, instead of the individual resistors, each time a voltage divider is used, it will be possible to evaluate the voltage applied each time to the resistors as representing a value of revolutions. For a step-by-step counter, the code disk is connected with at least one trigger cam indexing a ratchet wheel by a corresponding number of teeth of the ratchet wheel to the next position.

In another feature of this invention, the ratchet wheel will not be turned until it is driven by one or two trigger cams on the code disk. In this case, the ratchet wheel is prevented from revolving by two ratchet teeth which intersect with the outside periphery of the code disk. The ratchet wheel is locked since the teeth cannot be moved on due to their big depth and since, otherwise, they would abut against the periphery of the code disk. Between the two driving teeth, each time, there is lying a driving tooth of lower depth which ends above the covering surface of the code disk. The code disk can thus rotate below this ratchet tooth. A first trigger cam on the code disk carries the flat ratchet tooth along. The trigger cam is followed by a recess on the code disk so that the neighboring deep ratchet tooth can be turned as well. The following flat ratchet tooth is carried along by a second trigger cam. As the deep ratchet tooth is turned outwards, the subsequent flat ratchet tooth is advanced across the contour of the code disk. Thereupon, the initial condition will have been reached again, with the difference that the ratchet wheel will have been indexed by two ratchet teeth to the next position.

As further development, in order to ensure that the distance of the axes of rotation of the ratchet wheel and code disk will be maintained permanently and accurately, both the ratchet wheel and the code disk are directly supported in the housing so that the housing tolerances predetermine the distance of the two, parallel, axes of rotation of the ratchet wheel and of the code disk.

A particularly reliable and simple support is disclosed for the ratchet wheel where it is also advantageous that the contact pieces, similar to conductive tricks, are disposed on a printed circuit board.

BRIEF DESCRIPTION OF THE DRAWINGS

The preferred embodiment of this invention will be described in detail, with reference to the following figures, wherein.

DETAILED DESCRIPTION OF THE PREFERRED EMBODIMENTS

Figure 1:
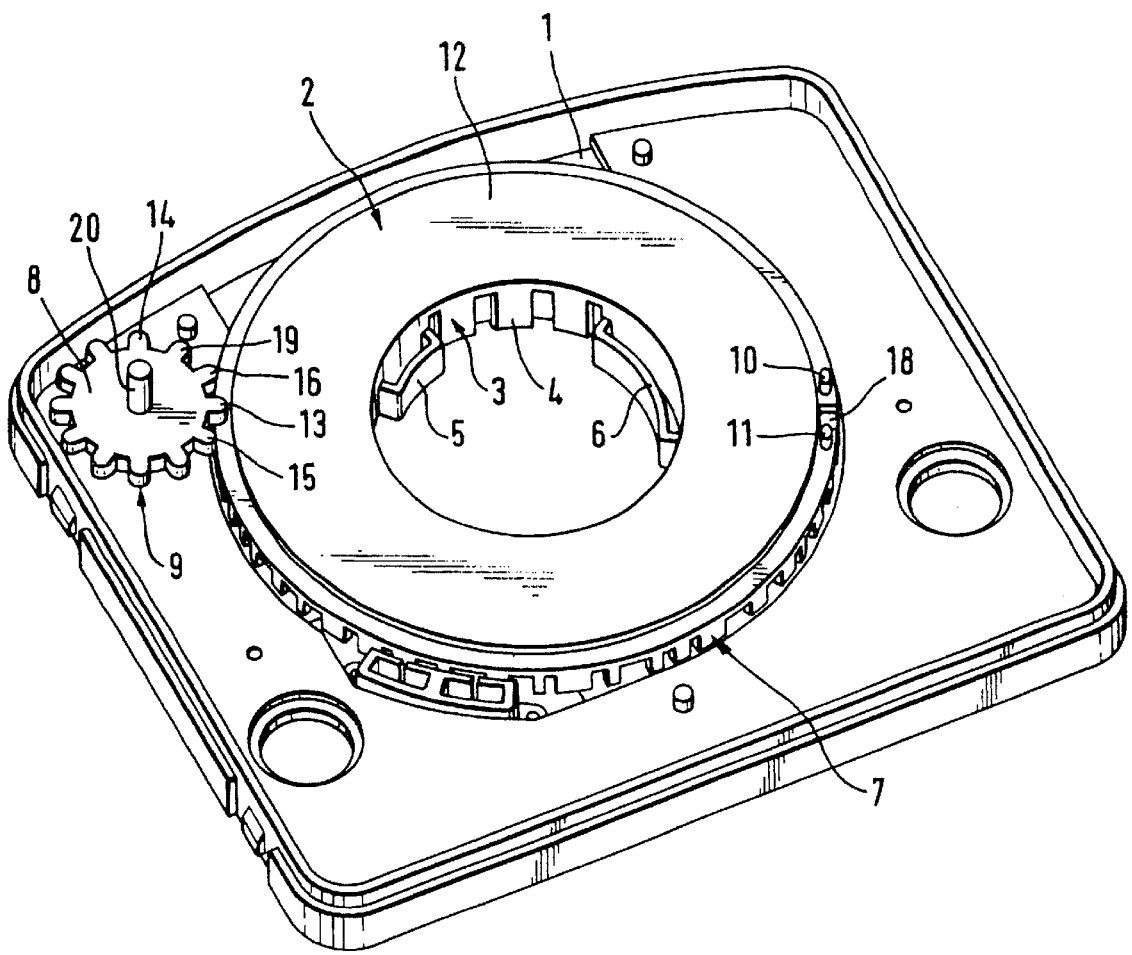
FIG. 1 shows a steering wheel angle sensor having a code disk supported in a housing of this invention.
Figure 2:
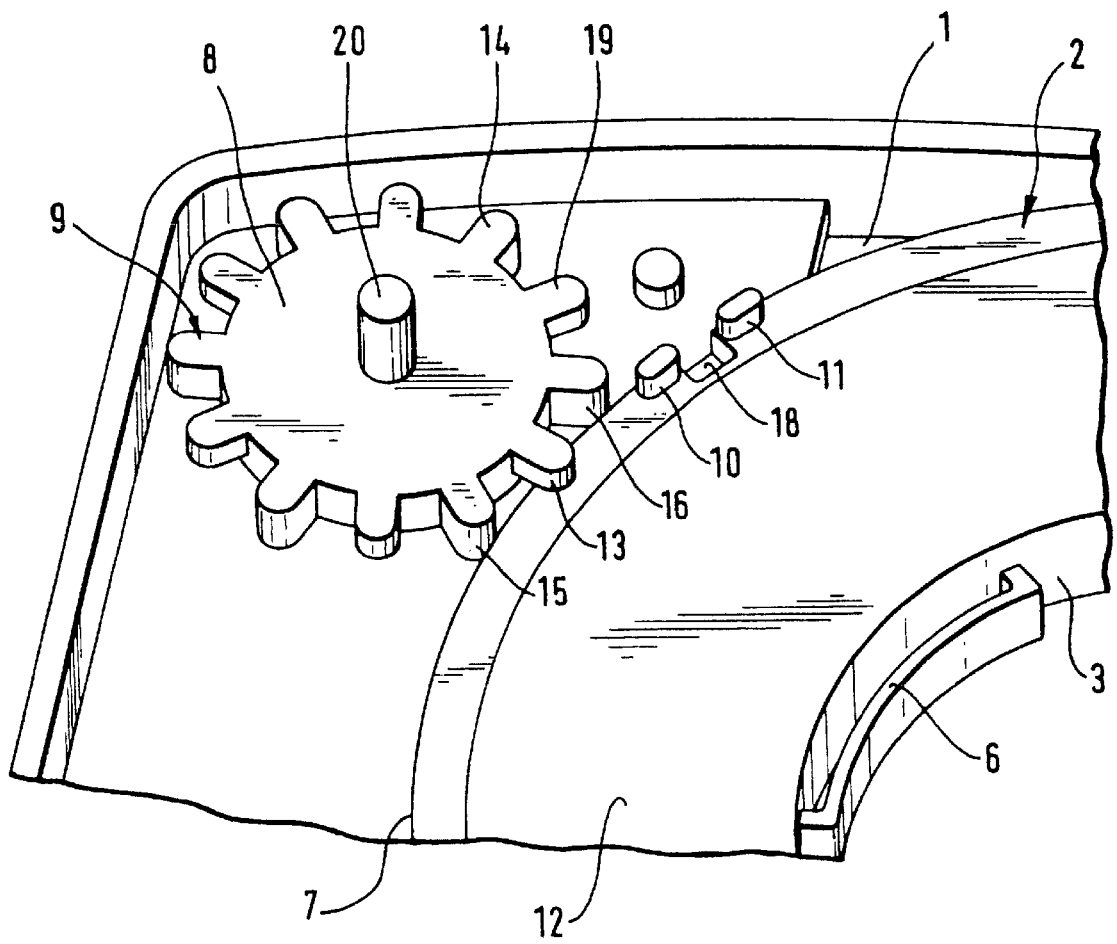
FIG. 2 is a detail of FIG. 1, showing the mechanical drive of the ratchet wheel.
Figure 3:
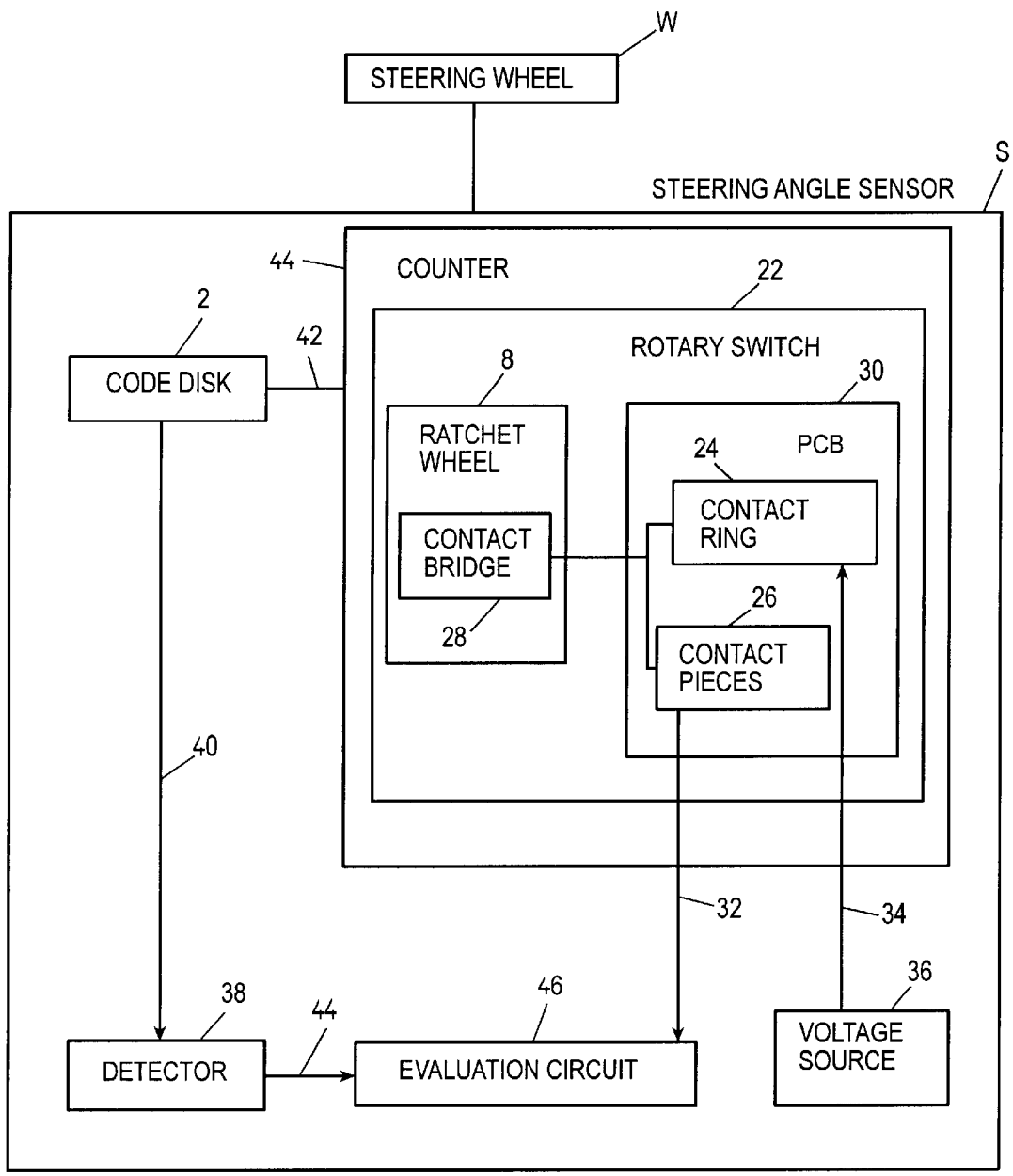
FIG. 3 is a block diagram of the components of the steering angle sensor.

FIG. 1 shows the housing bottom 1 of a housing cassette where the housing lid which locks the housing is not shown. FIG. 2 shows the mechanical drive of the ratchet wheel 8 in detail. FIG. 3 shows the components of the steering wheel sensor S for a steering wheel W.

A code disk 2 is rotatably supported on the housing bottom 1. The mode of operation of the code 2 disk was already described in the applicant's patent application 195 32 903.1. The code disk 2 has an inside annular wall 3 and an outside annular wall 7. Spring arms 4 are worked into the inside annular wall 3. Together with non-illustrated snap hooks they act in snap-type manner on the bottom side of the housing bottom 1 (not shown) and secures the code disk 2, preventing it from moving out of the plane of the housing bottom 1. Further, transport loops 5, 6 are shaped to the inside annular wall 3. By way of these transport loops 5, 6, the code disk 2 is indirectly driven by the steering wheel W so that the angle of rotation of the code disk 2 changes with the angle of rotation of the steering wheel W relative to the housing bottom 1 mounted fast to the vehicle. A coding on a code track in the form of square teeth extending parallel to the axis of rotation of the code disk 2 serves to determine the absolute value of the angle of rotation independently of the previous revolutions of the steering wheel. These square teeth are scanned by detectors 3 S. It is thus possible to determine the angle position of the code disk 2 within a 360-degree revolution as absolute value. However, what is not known is the number of revolutions already preformed by the code disk 2 relative to a central position before the electric power supply was turned on.

To determine the number of revolutions performed by the code disk 2, a ratchet wheel 8 with ratchet teeth 9 driven by two trigger cams 10, 11. In the simplest case, the idea is that one of the two trigger cams 10, 11 will index the ratchet tooth 13, located above the lid surface 12 of the code disk 2 and projecting into the contour of the code disk 2, by one step to the next position.

However, as already described above, it is also possible to provide the front faces of the consecutive teeth 13 and 16 with different heights, thus only every other ratchet tooth in correspondence with ratchet tooth 13 jutting out over the lid surface 12 of the code disk 2 while the two neighboring teeth 15, 16 reach down more deeply so that they abut on the outside annular wall 7 and thus lock a rotation of the ratchet wheel 8. This locking action will last until the trigger cam 10 catches the flat ratchet tooth 13 and rotatingly advances it a bit so that, then, the deeper ratchet tooth 16 can engage a recess 18 in the outside annular wall 7. The recess 18 will then also advance the ratchet tooth 16 until, at last, the flat ratchet tooth 19 will reach out over the lid surface 12 while the two neighboring high ratchet teeth 16, 14 keep the ratchet wheel 8 in position.

Since the ratchet wheel 8 has a total of 12 teeth, two teeth at a time being switched in one step, the ratchet wheel may altogether adopt six positions associated to the different numbers of revolutions of the code disk 2.

The ratchet wheel 8 itself serves as a drive for a rotary switch 22 where a contact ring 24 may be located below the ratchet wheel. Arranged around the edge of this contact ring 24 is a group of six insulated circular-sector-shaped contact pieces 26. Mounted to the ratchet wheel itself, then, is a bow-type contact piece, or contact bridge, 28 which links the inside contact ring 24 with one of the outside contact pieces 26, with the respective contact piece contacted each time depending on the angle position of the ratchet wheel 8. The design of the rotary switch 22 is very simple since the contact pieces 26 and the contact ring 24 are worked into a printed circuit board 30 The individual contact 26 pieces merge into output lines 32 on the printed circuit board 30 while the inside contact ring 24 is supplied with a voltage 34 from a voltage source 26. In this way, the voltage supply 34 to one of the contacts 26 is a piece of information on the position of rotation of the ratchet wheel 8 and thus on the number of revolutions of the code disk 2. Evaluation of the information on the rotation of the ratchet wheel 8 can be done in that the individual outputs 32 of the contact pieces 26 are led via resistors so that the voltage on the outputs, connected parallel lo each other, can make a statement on the number of revolutions of the code disk.

Furthermore, code disk 2 generates a modulated output signal 40 corresponding to the angle of rotation. The output signal 40 is input to detector 38. The detector 38 outputs the detected signal for input to an evaluation circuit 46. The evaluation circuit 46 determined the absolute value of the steering angle. The code disk 2 is also mechanically coupled 42 to a countair 44.

Also discernible in FIG. 1 is the shaft 20 of the ratchet wheel 8. At its lower end, not shown, this shaft projects into a supporting opening in the housing bottom 1 while the upper end is received by the housing lid (not shown).

Of course, other possibilities are conceivable within the scope of this invention in order to determine the number of revolutions of the code disk 2. What is of importance in this respect is that the transmission of the rotation of the code disk 2 to the ratchet wheel 8 is mechanical so that the code disk 2 and, hence, the ratchet wheel 8 will also be driven when the front wheels of the vehicle are pivoted even while the supply of voltage is turned off. When turning on the electric power supply of the vehicle, it will be recognizable immediately which is the angle position of the front wheels so that the yaw moment control system can properly react.

While this invention has been described in conjunction with specific embodiments outlined above, it is evident that many alternatives, modifications and variations will be apparent to those skilled in the art. Accordingly, the preferred embodiments of this invention as set forth above are intended to be illustrative, not limiting. Various changes may be made without departing from from the spirit and scope of the invention as defined in the following claims.

What is claimed is:

1. A steering angle sensor, comprising:
   a rotatably supported code disk, the angle of rotation of which corresponds to the angle of rotation of a steering wheel; and
   at least one detector the input of which is fed with the quantity modulated by the code disk and the output of which is fed to the input of an evaluation circuit which determines the absolute value of the steering angle,
   a mechanically coupled counter having driving teeth with axially alternating different heights coupled to said code disk, said code disk having an output signal fed to the evaluation circuit, wherein said output signal is a function of the number of full revolutions covered by the code disk relative to a fixed steering wheel position.

2. A steering angle sensor as claimed in claim 1 wherein the coupling between the code disk and the counter is realised by a mechanical gearing.

3. A steering angle sensor as claimed in claim 1, wherein the counter is a ratchet wheel and is formed by a rotary switch operated stepwise, with the switch, after any revolution of the code disk, indexing by one step to the neighboring contact piece, following an indexing direction which depends on the direction of revolution of the code disk.

4. A steering angle sensor as claimed in claim 3, wherein the output signal of the switch indicates the number of the revolutions of the code disk relative to a fixed steering wheel position by connecting the output line, corresponding to the number of revolutions, through to a voltage source.

5. A steering angle sensor as claimed in claim 3, wherein the rotary switch is formed by a number of even contact pieces, which number corresponds to the number of ineffable steps and which contact pieces are spaced relative to each other on an outside circle and are assigned the output lines, and in that the voltage source is connected to a through contact ring lying concentrically within the outside circle.

6. A steering angle sensor as claimed in claim 5, wherein the rotary switch has a contact bridge connected with the ratchet wheel and connecting the contact ring with one of the contact pieces in dependence on the position of rotation of the ratchet wheel.

7. A steering angle sensor as claimed in claim 6, wherein the ratchet wheel is provided with driving teeth and in that the code disk has two trigger cams lying side by side and indexing the ratchet wheel by two teeth to the next position upon any revolution of the code disk.

8. A steering wheel angle sensor as claimed in claim 7, further including a recess inserted between the two trigger cams with the trigger cams cooperating with the driving teeth so that the two trigger cams index two consecutive driving teeth of alternative different height to the next position, one tooth immediately after the other.

9. A steering angle sensor as claimed in claim 6, wherein the ratchet wheel and the code disk are rotatably supported in a common housing part at a distance relative to each other.

10. A steering angle sensor as claimed in claim 5, wherein the contact pieces and the contact ring are arranged together with other electrical components on a printed circuit board and in that the shaft of the ratchet wheel with preference is rotatably supported in supporting openings of two housing parts of the steering angle sensor.

* * * * *